United States Patent
Chen

(10) Patent No.: US 6,188,192 B1
(45) Date of Patent: Feb. 13, 2001

(54) SPINDLE MOTOR BACK-EMF SYNCHRONOUS RECTIFIER

(75) Inventor: Ching-Siang Chen, Laguna Niguel, CA (US)

(73) Assignee: Texas Instruments Incorporated, Dallas, TX (US)

( * ) Notice: Under 35 U.S.C. 154(b), the term of this patent shall be extended for 0 days.

(21) Appl. No.: 09/364,518

(22) Filed: Jul. 30, 1999

(51) Int. Cl.[7] ............... G11B 5/54; G11B 5/02; G11B 21/02; H02P 3/14
(52) U.S. Cl. ............. 318/563; 318/560; 318/377; 360/75
(58) Field of Search .................. 318/560–696; 360/70–105; 361/23–32, 92, 91, 93

(56) References Cited

U.S. PATENT DOCUMENTS

| | | | |
|---|---|---|---|
| 4,371,903 | 2/1983 | Lewis . | |
| 4,786,995 | * 11/1988 | Stupeck et al. | 360/75 |
| 4,866,554 | * 9/1989 | Stupeck et al. | 360/105 |
| 5,455,496 | * 10/1995 | Williams et al. | 318/563 |
| 5,504,402 | * 4/1996 | Menegoli | 318/377 |
| 5,508,874 | * 4/1996 | Williams et al. | 361/92 |
| 5,969,899 | * 10/1999 | Utenick et al. | 360/78.04 |
| 5,982,571 | * 11/1999 | Calfee et al. | 360/70 |

* cited by examiner

*Primary Examiner*—Paul Ip
(74) *Attorney, Agent, or Firm*—W. Daniel Swayze, Jr.; Wade James Brady, III; Frederick J. Telecky, Jr.

(57) ABSTRACT

A disk drive system including a disk having a magnetic surface and suppported for rotation on a spindle, a magnetic head being movable relative to the magnetic surface, and a spindle motor for driving the spindle. The motor generates a back-EMF voltage during an emergency condition and switches said back-EMF voltage during said emergency condition. A comparator circuit compares different phases of back-EMF voltage, and a control circuit controls said plurality of switches to supply said back-EMF voltage to direct said head to a stored position.

8 Claims, 5 Drawing Sheets

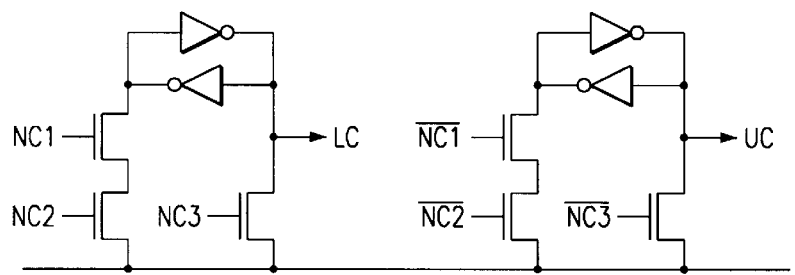
FIG. 7
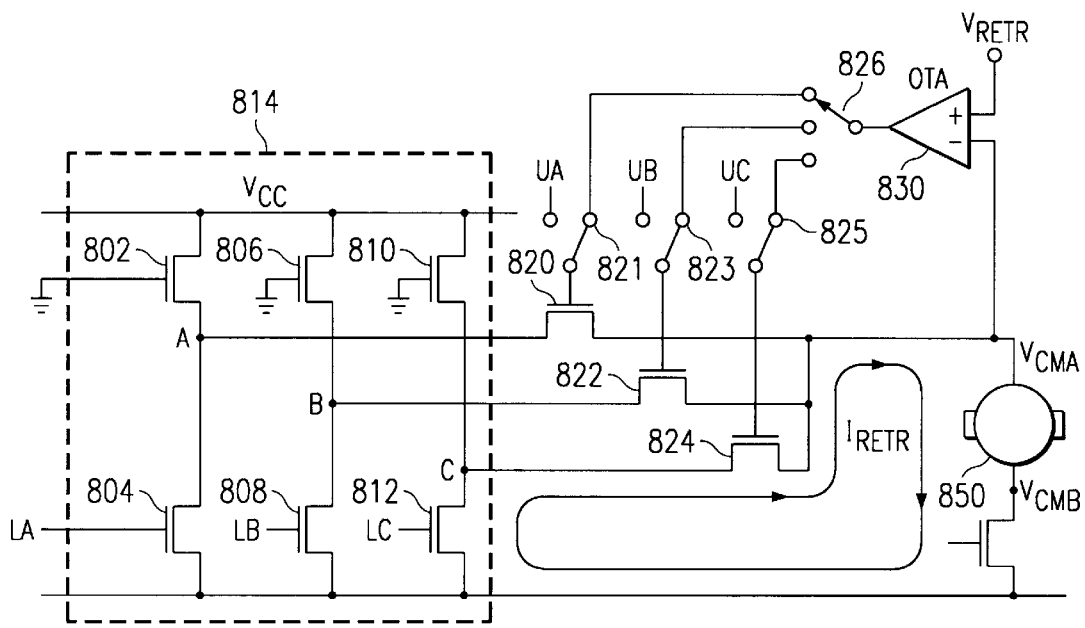
FIG. 8
| COMP 1 | COMP 2 | COMP 3 | UPPER | | | LOWER | | |
|---|---|---|---|---|---|---|---|---|
| | | | A | B | C | A | B | C |
| A>B | B<C | C>A | OFF | OFF | ON | OFF | ON | OFF |
| A>B | B<C | C<A | ON | OFF | OFF | OFF | ON | OFF |
| A>B | B>C | C<A | ON | OFF | OFF | OFF | OFF | ON |
| A<B | B>C | C<A | OFF | ON | OFF | OFF | OFF | ON |
| A<B | B>C | C>A | OFF | ON | OFF | ON | OFF | OFF |
| A<B | B<C | C>A | OFF | OFF | ON | ON | OFF | OFF |
FIG. 10

SPINDLE MOTOR BACK-EMF SYNCHRONOUS RECTIFIER

The present invention relates to an emergency head retract system for magnetic disk drives and more particularly to a system that takes advantage of the kinetic energy stored in rotating spindle mass for providing the energy required to unload the heads in a disk drive system in a power failure or other emergency situation.

BACKGROUND OF THE INVENTION

Magnetic disk storage systems are used widely to provide large volumes of relatively low-cost, computer-accessible memory or storage. A typical disk storage device has a number of disks coded with a suitable magnetic material mounted for rotation on a common spindle and a set of transducer heads carried in pairs on elongated supports for insertion between adjacent disks, the heads of each pair facing in opposite directions to engage opposite faces of the adjacent disk. The support structure is typically coupled to a positioner motor, and the positioner motor typically includes a coil mounted within a magnetic field for linear movement and oriented relative to the disks to move the heads radially over the disk surfaces to thereby enable the head to be positioned over any annular track on the surfaces. In normal operation, the positioner motor, in response to control signals from the computer, positions the transducer heads radially for recording data signals on or retrieving data signals from a pre-selected one of a set of concentric recording tracks on the disks.

The transducer heads are supported above the disk surfaces by a film of air to prevent contact therebetween which might thereby otherwise damage one or both members. The heads are typically designed to actually fly above the disk recording surfaces of heights less than 50 microinches. Irreparable damage can result from an electrical power failure which slows the disk and allows the head to settle into contact with the disk surfaces. As a result, it is imperative that the heads be withdrawn from the vicinity of the disk if the disk rotational speed is substantially reduced. It is also important in removable media disk drives to ensure that the heads are removed from the vicinity of the disk surfaces in event of power failure so that the disk can be removed from the system without damage to the heads.

The process of removing the heads from the disks in an emergency situation is referred to as an "emergency unload procedure" and requires the heads to be moved radially toward the disk's outer tracks axially away from the disk surfaces (OD). Although loss of power is probably the primary reason for initiating an emergency unload procedure, the procedure is typically also initiated when disk speed does not remain within tolerances, positional error is detected, or write circuits faults that could affect the stored data are detected.

Basically, all modern disk drives incorporate some assistance for executing an emergency unload procedure in order to avoid the loss of data and prevent disk and/or head damage. In typical prior art, emergency unload systems, a capacitor is charged by the drive power supply during normal operation. During the detection of an emergency condition, a relay or equivalent switching means switches the capacitor across the positional coil terminals to provide the electromagnetic force necessary to move the.head support structure across the disk surfaces. Upon approaching the disk's outer edge, the head support structure encounters a mechanical ramp which imparts an axial force to the support structure, thus unloading the heads from the disk.

FIG. 1 illustrates a prior art system, which includes a three-phase spindle motor 130 which drives the disks, and a drive circuit 116, which is used to control the commutation of motor 130 during normal operation. As illustrated in FIG. 1, the drive circuit 116 includes a plurality of FET circuits which have a inherent set of diodes numbered 110, 112 and 114 across the source to drain of each FET. In addition, to connect to the VCM (voice control motor) 120, a set of Schottky diodes, numbered 102, 104 and 106, connect with capacitor 100, which is connected in parallel with the VCM motor 120. In operation, the back-EMF voltage from motor 130 is fed to Schottky diodes 102, 104 and 106, respectively, and from the Schottky diodes 102, 104 and 106, the back-EMF voltage is fed to capacitor 100. The three Schottky diodes 102, 104 and 106 perform passive rectification to allow the back-EMF voltage to charge the capacitor 100, and this charge stored on capacitor 100 is used to power the VCM motor 120 during emergency conditions.

However, the voltage produced by the motor 130 is typically very low on the order of 3.5 volts peak-to-peak in mobile servo application. During emergency conditions, the back-EMF voltage is rectified by the beforementioned diodes, and consequently, as a result of the rectification, the back-EMF voltage is reduced to approximately 2.2 volts peak-to-peak. Further losses occur as a result of the voltage drops across two diodes in series on the VCM retract current path, resulting in only approximately 0.7 or 0.8 voltages being applied to the VCM motor 120. As a consequence, the current available to move the heads across the disk surface and out onto the ramp is significantly reduced. A large amount of current is required to park the head on the ramp and this is not sufficient for any true ramp load applications.

FIG. 2 illustrates another circuit used to convert the back-EMF voltage to energize the VCM motor 220. This circuit includes a set of bipolar transistors 202, 204, 206, 208, 210 and 212 that are used to control the back-EMF current. However, this circuit suffers from two additional defects. First, depending upon a particular design, the finite value of $V_{BE,ON}$ may vary significantly with process, thus resulting in a deadband where no rectification occurs and no back-EMF voltage is available. Additionally, the circuit in FIG. 2 requires a discrete logic circuit 222 to control the bases of transistors 202, 204, 206, 208 and 212. The bipolar circuits are not compatible with CMOS process, and, as a consequence, the circuit must be external to the circuit (assuming a CMOS circuit) used to drive the motor. Thus, consequently, there is a need for a circuit which is economical in terms of current to operate and is highly accurate.

SUMMARY OF THE INVENTION

A disk drive system includes a disk having a magnetic surface and supported for rotation on a spindle, a magnetic head being movable relative to the magnetic surface, and a spindle motor for driving the spindle. The motor generates a back-EMF voltage during an emergency condition and switches the back-EMF voltage during said emergency condition. A comparator circuit compares different phases of back-EMF voltage, and a control circuit controls a plurality of switches to supply the back-EMF voltage to direct the head to a stored position.

BRIEF DESCRIPTION OF THE DRAWINGS

FIGS. 5–7 illustrates a decode and latch circuit of the present invention.

FIG. 8 illustrates an additional circuit to drive the VCM motor.

FIG. 10 illustrates a truth table for decode and latch circuit 370.

DETAILED DESCRIPTION OF THE INVENTION

Figure 1:
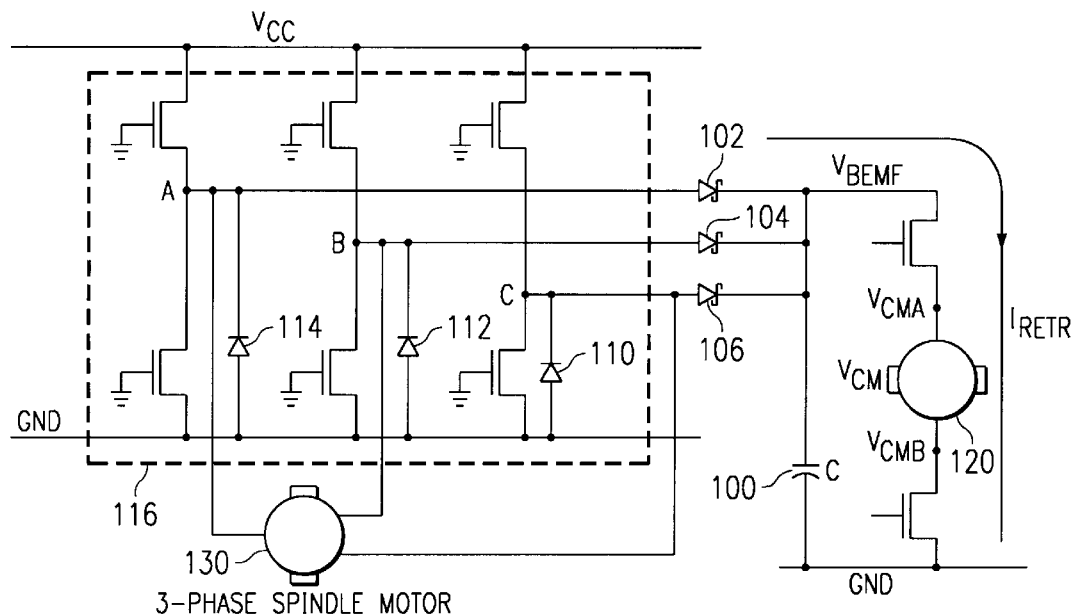
FIG. 1 illustrates a circuit to drive a VCM motor.
Figure 2:
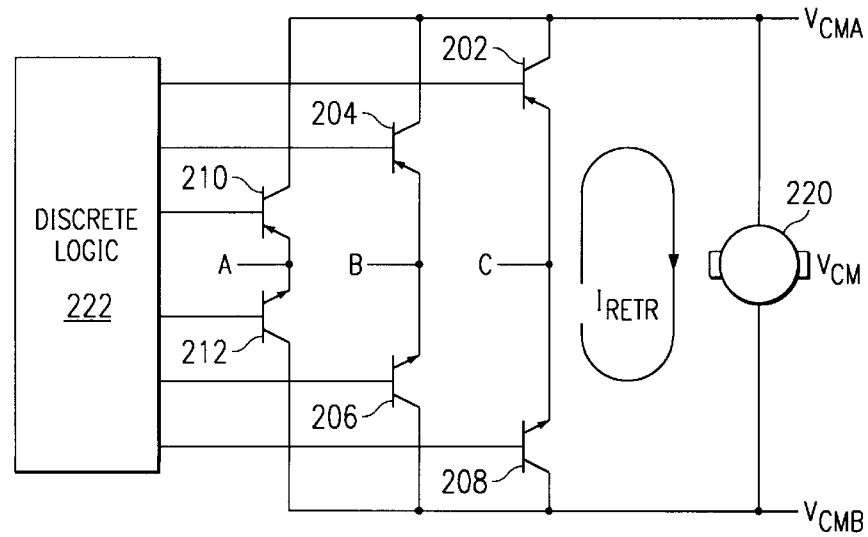
FIG. 2 illustrates another circuit to drive another VCM motor.
Figure 3:
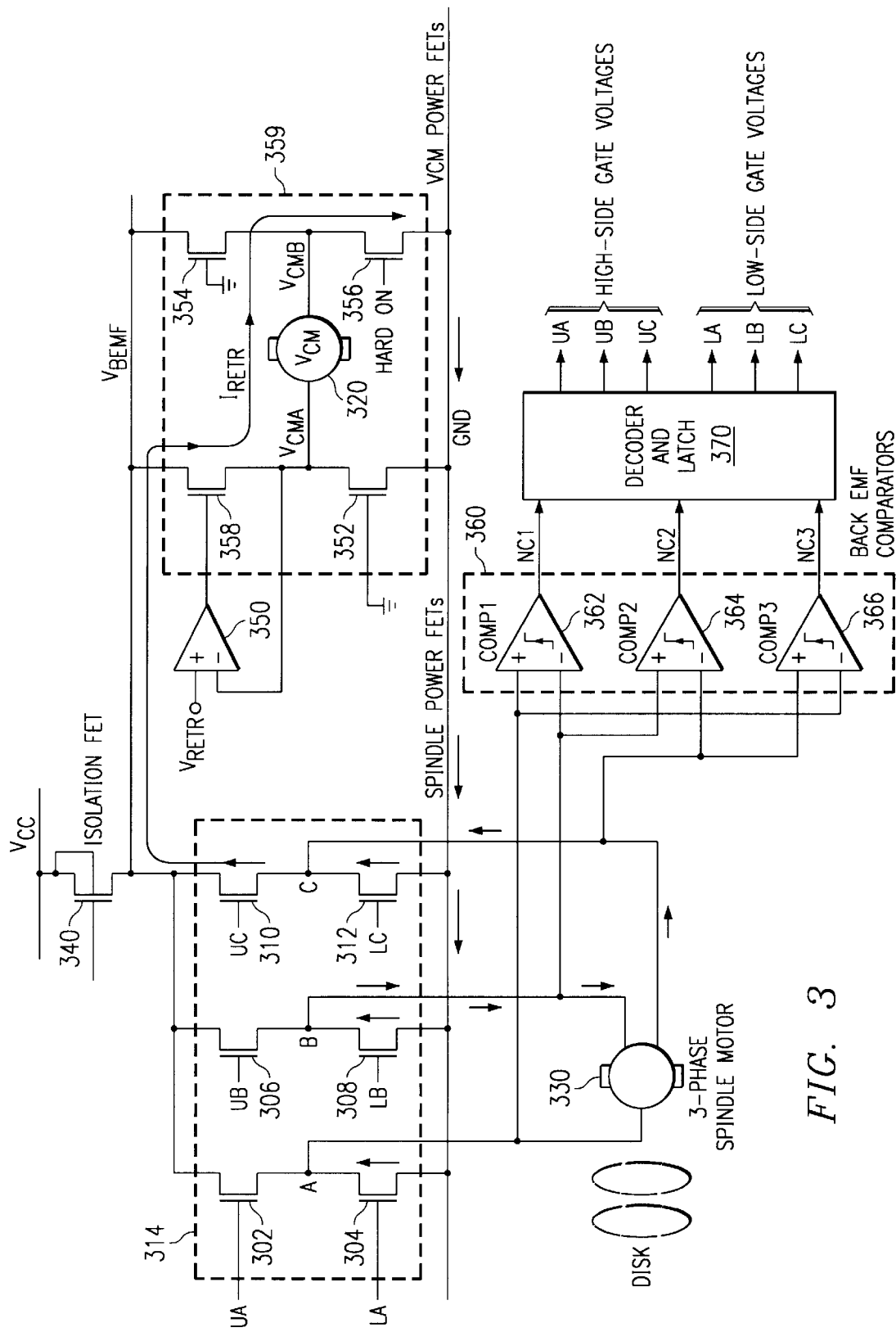
FIG. 3 illustrates a third circuit of the present invention to drive a VCM motor.

As illustrated in FIG. 3, a spindle motor 330 is connected to a three-phase H-bridge power FET 314 to control the spindle motor 330. Control signals to control the operation of the spindle motor 330 are input to the respective gates of FET 302, FET 304, FET 306, FET 308, FET 310 and FET 312. FET 302 is connected to FET 304 to form a control circuit for phase A of motor 330; additionally, FET 306 and FET 308 are connected together to form a control circuit for phase B of motor 330; and FET 310 and FET 312 are connected together to form a control circuit for phase C of motor 330. The respective control circuits for each phase are connected to the phase of three-phase motor 330. The three-phase H-bridge power FET 314 is connected to an isolation circuit 340 which is illustrated as an isolation FET. The isolation FET 340 is connected to the voltage Vcc, and a control voltage is normally applied to the gate of isolation circuit 340. However, during emergency conditions, the gate of isolation FET 340 is grounded, eliminating the connection between voltage Vcc and the circuit 314. The circuit 314 is connected through a control loop including the commutation control circuit 360 and decode and latch circuit 370 to the VCM motor 320. As illustrated in FIG. 3, the control circuit 359 includes a H-bridge of FET switches including FET 352, FET 354, FET 356 and FET 358. These FET circuits are operated in pairs, two FETS, to drive the VCM motor either one way or another in accordance with the direction that the head is desired to travel. For example, if a head is to be driven to the inside or ID position of the disk, FET 352 and FET 354 are energized through their respective gates so that current flows from the FET 354 to FET 352 through VCM motor 320. Conversely, if the motor 320 is to be driven so as to drive the heads to the OD direction, FET 358 and FET 356 are utilized through the respective gates. This allows current to flow through FET 358 through motor 320 and through FET 356. Additionally, during emergency conditions, each phase of the three-phase spindle motor is connected to the comparator circuit 360. The comparator circuit 360 includes three comparator circuits including comparator 362, comparator 364 and comparator 366. The inputs to comparator 362 are connected to the A and B phase of three-phase spindle motor 330. The inputs to comparator 364 are connected to the B phase and the C phase of three phase spindle motor 330. The inputs to comparator 366 are connected to the C phase and to the A phase of three-phase spindle motor 330.

The output of comparator 362 is input to the decoder and latch circuit 370. The output of comparator 364 is input to the decoder and latch circuit 370, and the output of comparator 366 is input to the decoder and latch circuit 370. The decoder and latch circuit 370 outputs control signals that are input to the FETS of the control circuit 314. The UA signal, which is one of the control signals, is input to the gate of FET 302; the UB signal is input to the gate of FET 306; and the UC signal is input to the FET 310. Additionally, these three FETS, 302, 306 and 310, are considered to be the upper control circuits for the three-phase spindle motor 330. Additionally, a lower set of FETS 304, 308 and 312 are used to control the three-phase spindle motor 330. The LA signal controls the gate of FET 304. The LB signal is used to control the gate of FET 308, and the LC signal is used to control the gate of FET 312.

Furthermore, a linear amplifier 350 is used to control the FET 358 during emergency conditions. The gate of FET 356 is connected so as to turn FET 356 hard on during emergency conditions. The linear amplifier 350 is used to control the current by controlling the gate through FET 358. The FET 358 is used to operate like a voltage follower circuit. The voltage $V_{RETR}$ is used to control the linear amplifier 350 such that the voltage at VCMA is equal to the voltage $V_{RETR}$. Since the FET 356 is turned hard on, the voltage at VCMB is fairly close to ground. In this manner, the voltage drop across VCMA and VCMB is closely regulated to the voltage $V_{RETR}$. This is to limit the retract current to a well-controlled value so as to prevent the head from gathering a large amount of speed while being initially retracted across the disk. After this first phase, the head is placed near the knee of the ramp. During the second stage, the head is moved from the knee to the top of the ramp at a greater speed, and the linear amplifier is operated to allow maximum current to flow through FET 358 and, thus, through VCM motor 320 and transistor 356 so that the head is moved with a higher rate of speed to overcome the resistance of the ramp to pull the head up the ramp.

Figure 4:
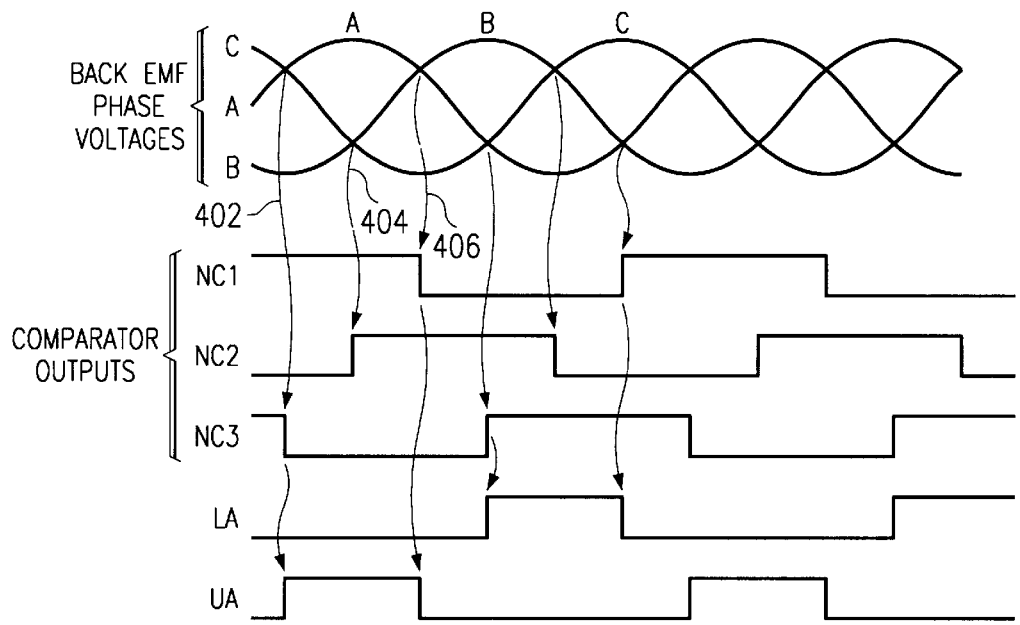
FIG. 4 illustrates a timing diagram of back-EMS phase signals, comparator output wave forms, and low and high signals.

The back-EMF phase voltage is illustrated in FIG. 4. FIG. 4 illustrates three phases of the back-EMF voltage, namely phase A, phase B, and phase C. The inter-relationship of each phase to another phase is used to generate the UA and UL signals. The UB, UC, LB or LC signals are generated in a similar fashion.

When the A phase is increasing and crosses the C phase at point 402, the signal NC3 is turned off allowing the UA signal to go high. Likewise, when the C phase is decreasing and the B phase is increasing, the signal NC2 is high at point 404. When the A phase is decreasing and the B phase is increasing, at point 406, the signal NC1 goes low resulting in signal UA to go low. When the A phase is going low and the C phase is rising at the point of intersection, the NC3 signal goes high resulting in the signal LA to go high. When the B phase is decreasing and crosses the increasing A phase, the signal LA goes low and the signal NC1 goes high. A truth table for the control signals for circuit 314 is illustrated in FIG. 10.

Figure 5:
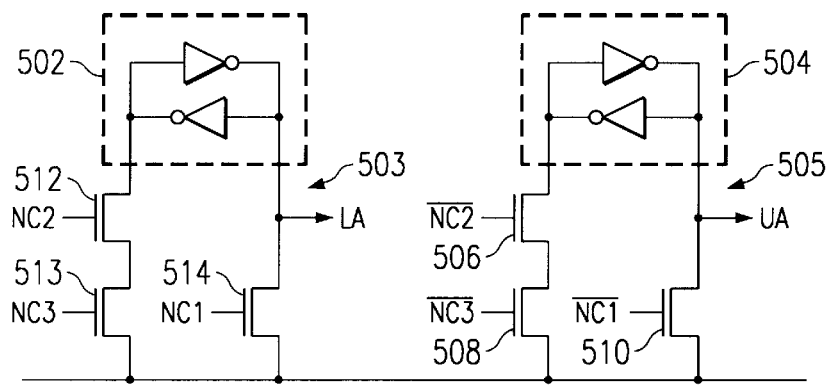
Figure 6:
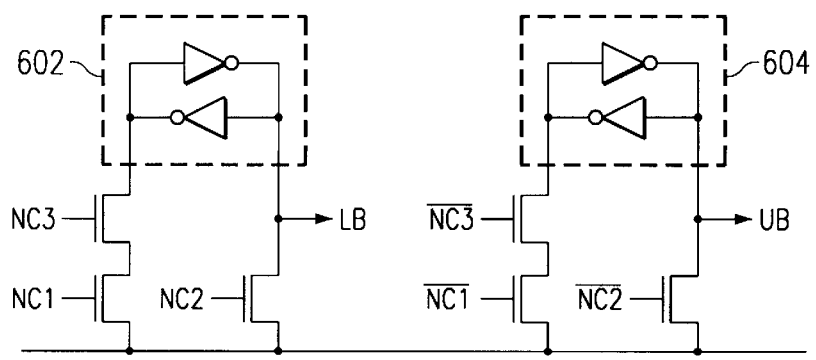

FIGS. 5, 6, and 7 illustrate a portion of the decode and latch circuit 370 to eliminate glitches from the phases. Using FIG. 5 as an illustration, the circuit includes two circuits 503 and 505, one to generate the UA signal, namely 505 circuit, and another to generate the LA signal, namely 503 circuit. Both of these circuits 503 and 505 include a latch circuit 504 and latch circuit 502. FET circuit 506 is connected to FET circuit 508. The FET circuit 506 is controlled by the inverse of signal NC2 while the FET 508 is controlled by the inverse of signal NC3. The FET 510 is controlled by the inverse of the signal NC1. The signal UA is output from a terminal between circuit 504 and FET circuit 510. Likewise, FET 512 is connected to FET 513 which is in turn connected to latch circuit 502. The FET 514 is connected to latch circuit 502. The FET 512 is controlled by the signal NC2 while the FET 513 is controlled by the circuit NC3 through the respective gates. Likewise, the FET 514 is controlled by the signal NC1. The output is signal LA which is output from a terminal between latch circuit 502 and FET 514.

FIG. 6 illustrates a circuit to generate the signals LB and UB. Likewise, FIG. 7 illustrates a circuit to generate the signal LC and the signal UC.

Figure 9:
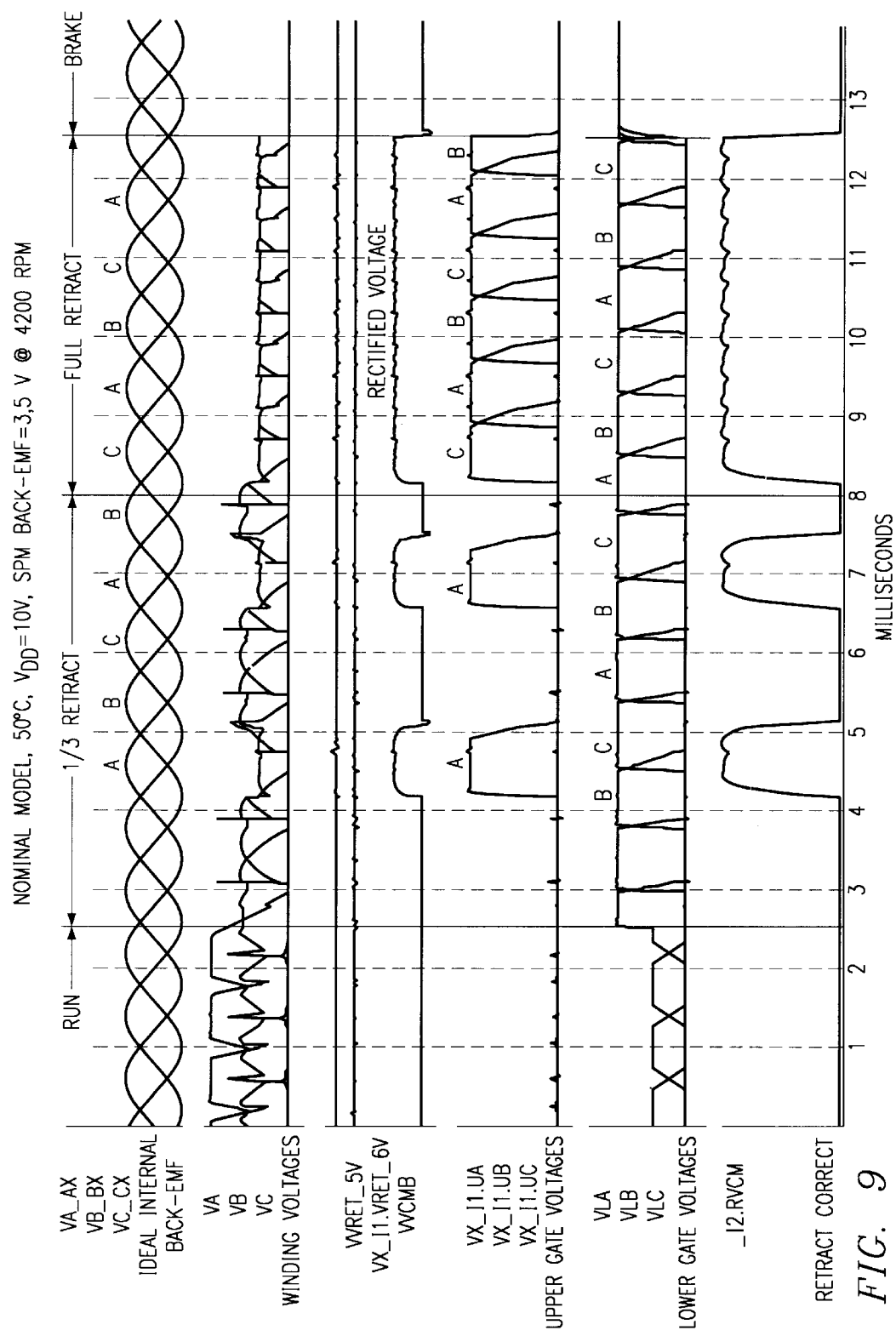
FIG. 9 illustrates results shown with the present invention.

FIG. 8 illustrates an alternate circuit avoiding the use of isolation FET 340. In FIG. 8, the control circuit for the motor is illustrated as circuit 814. The upper circuit, namely FETS 802, 806 and 810, are not controlled by signals UA, UB, and UC, respectively, but are grounded. The lower circuit, namely FET 804, FET 808, and FET 812 is controlled by signal LA, signal LB, and signal LC, respectively. In the circuit of FIG. 8, the signals UA, UB, UC, LA, LB and LC are generated by the back-EMF comparators and the decode and latch circuit 370 as illustrated in FIG. 3. However, the signals UA, UB, and UC control the switch 826. Similar to the illustration in FIG. 3, the linear amplifier 830 operates the FET 820, FET 822, and FET 824 in two phases. During the first phase, the gate voltages of the FET 820, FET 822 and FET 824 are connected to the switch 826, which is in turn controlled by the signals UA, UB and UC. When UA is high, the switch 826 will provide the output of the linear amplifier 320 onto the FET 820. When UB is high, the switch 826 will provide the output of the amplifier 320 onto the FET 822. When VC is high, the switch 826 will provide the output of the amplifier 320 onto the FET 824. During the second phase, the gate voltages of the FET 820, the FET 822 and the FET 824 are connected to the signals UA, UB and UC, respectively. During the first phase, the FET 820, the FET 822 and the FET 824 are operated so that a well-controlled current is supplied to VCM motor 850. Likewise, during the second phase, the linear amplifier 830 operates the FET 820, FET 822, and the FET 824 such that maximum current flows through the VCM motor 850. Thus, the heads are able to travel slowly during the first stage as they approach the knee of the ramp and, during the second phase, travel quickly up the ramp. FIG. 9 illustrates various waveforms as described.

What is claimed is:

1. A disk drive system, said system including a disk having a magnetic surface and supported for rotation on a spindle, a magnetic head being movable relative to said magnetic surface, and a spindle motor for driving said spindle, said system comprising:

said motor generating a back-EMF voltage during an emergency condition;

a plurality of switches for switching said back-EMF voltage during said emergency condition;

a comparator circuit for comparing different phases of back-EMF voltage; and a control circuit to control said plurality of switches to supply said back-EMF voltage to direct said head to a stored position.

2. A disk drive system, as in claim 1, wherein said control circuit includes a truth table to generate control signals to control said plurality of switches.

3. A disk drive system, as in claim 1, wherein said plurality of switches includes an upper switch and a lower switch.

4. A disk drive system, as in claim 1, wherein said control circuit includes a latch circuit.

5. A method for operating a disk drive system, said system including a disk havig a magnetic surface and suppported for rotation on a spindle, a magnetic head being movable relative to said magnetic surface, and a spindle motor for driving said spindle, said method including the steps of:

generating a back-EMF voltage from said motor during an emergency condition;

switching said back-EMF voltage during said emergency condition;

comparing different phases of said back-EMF voltage; and controlling said plurality of switches to supply said back-EMF voltage to direct said head to a stored position.

6. A method for operating a disk drive system, as in claim 5, wherein said control step includes accessing a truth table to generate control signals to control said plurality of switches.

7. A method for operating a disk drive system, as in claim 5, wherein said switching step includes switching an upper switch and a lower switch.

8. A method for operating a disk drive system, as in claim 5, wherein said control step includes latching a latch circuit.

* * * * *